(12) United States Patent
Chen et al.

(10) Patent No.: US 11,382,461 B2
(45) Date of Patent: Jul. 12, 2022

(54) BEAN GRINDING DEVICE AND BEAN GRINDING COFFEE MACHINE

(71) Applicant: VESTA ELECTRICAL APPLIANCE MANUFACTURING (ZHONGSHAN) CO., LTD., Guangdong (CN)

(72) Inventors: Xiaolin Chen, Guangdong (CN); Guozhi Zhao, Guangdong (CN)

(73) Assignee: Guang Dong Elec-Tech Retop LED Display Co., Ltd., Zhuhai (CN)

( * ) Notice: Subject to any disclaimer, the term of this patent is extended or adjusted under 35 U.S.C. 154(b) by 70 days.

(21) Appl. No.: 16/957,656

(22) PCT Filed: May 25, 2018

(86) PCT No.: PCT/CN2018/088429
§ 371 (c)(1),
(2) Date: Jun. 24, 2020

(87) PCT Pub. No.: WO2019/128077
PCT Pub. Date: Jul. 4, 2019

(65) Prior Publication Data
US 2021/0052112 A1   Feb. 25, 2021

(30) Foreign Application Priority Data
Dec. 26, 2017   (CN) .......................... 201711430948.0

(51) Int. Cl.
*A47J 42/18*   (2006.01)
*A47J 42/16*   (2006.01)
(Continued)

(52) U.S. Cl.
CPC ............... *A47J 42/18* (2013.01); *A47J 42/16* (2013.01); *A47J 42/20* (2013.01)

(58) Field of Classification Search
None
See application file for complete search history.

(56) References Cited

U.S. PATENT DOCUMENTS

| | | | |
|---|---|---|---|
| 5,564,636 A | * | 10/1996 | Mock ...................... A47J 42/16 241/261.2 |
| 2002/0117566 A1 | | 8/2002 | Cheng |

(Continued)

FOREIGN PATENT DOCUMENTS

| CN | 102883642 A | 1/2013 |
|---|---|---|
| CN | 102949108 A | 3/2013 |

(Continued)

OTHER PUBLICATIONS

English translate (CN202843356U), retrieved date Oct. 19, 2021.*
(Continued)

*Primary Examiner* — Jessica Cahill
*Assistant Examiner* — Mohammed S. Alawadi
(74) *Attorney, Agent, or Firm* — Brandon V. Zuniga; James R. Gourley; Carstens & Cahoon, LLP (57) ABSTRACT

A bean grinding device and a bean grinding coffee machine including the bean grinding device the bean grinding device includes a grinding assembly and an adjusting assembly; the grinding assembly includes a bean grinding chamber, an outer grinding wheel, and an inner grinding wheel; the outer grinding wheel and the inner grinding wheel are disposed inside the bean grinding chamber; the adjusting assembly includes at least two stages of adjusting mechanisms; the at least two stages of adjusting mechanisms includes a first adjusting mechanism and a second adjusting mechanism; the first adjusting mechanism and the bean grinding chamber are connected by means of a first track; the second adjusting mechanism and the outer grinding wheel are connected by means of a second track; and positions of the first adjusting mechanism and the second adjusting mechanism are relatively fixed in an axial direction.

15 Claims, 4 Drawing Sheets

(51) Int. Cl.
*A47J 42/20* (2006.01)
*A47J 42/08* (2006.01)
*A47J 31/42* (2006.01)

(56) References Cited

U.S. PATENT DOCUMENTS

| | | | |
|---|---|---|---|
| 2010/0198413 A1* | 8/2010 | De' Longhi | A47J 31/42 700/275 |
| 2012/0138721 A1 | 6/2012 | Hergesell et al. | |
| 2013/0001339 A1* | 1/2013 | Hoare | A47J 42/08 241/33 |
| 2017/0311759 A1 | 11/2017 | Xue et al. | |

FOREIGN PATENT DOCUMENTS

| | | | |
|---|---|---|---|
| CN | 202843356 U | * | 4/2013 |
| CN | 202843356 U | | 4/2013 |
| CN | 202960136 U | | 6/2013 |
| CN | 104172946 A | | 12/2014 |
| CN | 107981728 A | | 5/2018 |
| CN | 209090894 U | | 7/2019 |
| JP | 4-354548 A | | 12/1992 |
| JP | 3106668 U | | 1/2005 |
| TW | M550602 U | | 10/2017 |
| WO | 2004093615 A2 | | 11/2004 |
| WO | 2016120315 A1 | | 8/2016 |

OTHER PUBLICATIONS

Extended European Search Report for European Application No. 18897742.5 dated Nov. 30, 2020 (6 pages).
International Search Report for Application No. PCT/CN2018/088429 dated Sep. 29, 2018 (3 pages).
Office Action for Chinese Application No. 201711430948.0 dated Sep. 30, 2019 (5 pages).
Office Action for Japanese Application No. 2020-535542 dated Jul. 7, 2021 (2 pages).

* cited by examiner

BEAN GRINDING DEVICE AND BEAN GRINDING COFFEE MACHINE

CROSS-REFERENCE TO RELATED APPLICATION

This application is a U.S. National Stage of International Application No. PCT/CN2018/088429, filed on May 25, 2018 and published as WO 2019/128077 on Jul. 4, 2019, which claims priority to the Chinese Patent Application No. 201711430948.0, entitled "BEAN GRINDING DEVICE AND BEAN GRINDING COFFEE MACHINE", filed on Dec. 26, 2017. Each application, publication, and patent listed in this paragraph is hereby incorporated by reference in its entirety.

TECHNICAL FIELD

The present application relates to a bean grinding device and a bean grinding coffee machine.

BACKGROUND

Coffee is a popular beverage. Besides the variety and quality of coffee beans, the quality of coffee powder has an influence, which should not be ignored, on the quality of coffee. The quality of the coffee powder depends heavily on a choice of a coffee grinding device.

A conventional device for grinding coffee beans can adjust sizes of the coffee powder by adjusting a shift position, but a case that, when bean grinding devices of same or different batches grind coffee beans by means of a same gear position of thickness, amount and thickness of ground powder of coffee beans will be different due to manufacturing process errors and assembly errors of parts, will occur, and it is difficult to meet uniformity requirements.

SUMMARY

Based on this, it is necessary to provide a bean grinding device and a bean grinding coffee machine, which can achieve the above uniformity requirements with no need to improve manufacturing and assembly accuracy of parts.

A bean grinding device including a grinding assembly and an adjusting assembly, wherein the grinding assembly includes a bean grinding chamber, an outer grinding wheel, and an inner grinding wheel; the outer grinding wheel and the inner grinding wheel are disposed inside the bean grinding chamber; the adjusting assembly includes at least two stages of adjusting mechanisms; the at least two stages of adjusting mechanisms includes a first adjusting mechanism and a second adjusting mechanism; the first adjusting mechanism and the bean grinding chamber are connected by means of a first track; the second adjusting mechanism and the outer grinding wheel are connected by means of a second track; positions of the first adjusting mechanism and the second adjusting mechanism are relatively fixed in an axial direction; and the first adjusting mechanism and the second adjusting mechanism are configured to adjust a height of the outer grinding wheel and adjust a distance between the outer grinding wheel and the inner grinding wheel.

In an embodiment, the first adjusting mechanism includes a first adjusting ring and a fixing member; the first adjusting ring has a first track structure extending from a first position to a second position in the axial direction; the bean grinding chamber includes a snap-fit member; the snap-fit member is disposed on an outer side wall of the bean grinding chamber, and configured to slide along the first track structure and adjust a relative position between the first adjusting mechanism and the bean grinding chamber in the axial direction; and the fixing member is configured to fix the first adjusting ring in a circumferential direction.

In an embodiment, the first track structure is a threaded structure disposed on an inner surface of the first adjusting ring; an outer side wall of the first adjusting ring has a clamping groove; the bean grinding chamber is provided with a clamping member; and the fixing member is installed in the clamping member and inserted into the clamping groove.

In an embodiment, the first track structure is a bevel structure disposed on an outer surface of the first adjusting ring; the fixing member is fixedly connected to the first adjusting ring; the bean grinding chamber has a positioning member; when the snap-fit member slides along the bevel structure, the fixing member slides along the positioning member and fixes the first adjusting ring.

In an embodiment, the positioning member is a wavy track structure, and the wavy track structure is arranged parallel to the bevel structure.

In an embodiment, the grinding assembly further includes an outer grinding wheel sleeve; the outer grinding wheel is fixedly installed in the outer grinding wheel sleeve; the outer grinding wheel sleeve includes a protruding member and a position locking member; the protruding member is configured to be connected to the second track of the second adjusting mechanism; the bean grinding chamber has a position locking groove; and the position locking member is configured to be locked in the position locking groove and restrict a movement of the outer grinding wheel in a circumferential direction.

In an embodiment, the second adjusting mechanism includes a second adjusting ring; a threaded track is disposed on an inner surface of the second adjusting ring; and the protruding member is configured to move along the threaded track and adjust the distance between the outer grinding wheel and the inner grinding wheel.

In an embodiment, the second adjusting mechanism further includes a pressing sheet; the second adjusting ring includes a rotatable gear and an edge member supporting the rotatable gear; and the pressing sheet is disposed at the edge member and configured to be fixedly connected to the first adjusting mechanism.

In an embodiment, the second adjusting mechanism further includes a shift knob and a transmitting assembly; the transmitting assembly meshes with the second adjusting ring; and the transmitting assembly is driven to rotate by rotating the shift knob, and the second adjusting ring is driven to rotate.

A bean grinding coffee machine includes any one of the bean grinding devices above.

In the present application, the distance between the inner grinding wheel and the outer grinding wheel is adjusted by the at least two stages of adjusting mechanisms provided in the grinding device, with no need to improve the manufacturing and assembly accuracy of parts. The first adjusting mechanism is slidably connected to the bean grinding chamber; the second adjusting mechanism is slidably connected to the outer grinding wheel; and positions of the first adjusting mechanism and the second adjusting mechanism are relatively fixed in the axial direction. Independently adjusting either the first adjusting mechanism or the second adjusting mechanism can achieve a movement of the outer grinding wheel in the axial direction, thus achieving a precise adjustment of the distance between the outer grinding wheel and the inner grinding wheel. The arrangement of multi-staged adjustment enables multiple bean grinding devices of the same batch or of different batches, under a case of the same configuration, to grind coffee beans into uniform and steady powder with good uniformity in the amount and in the sizes, thereby ensuring the taste of coffee.

DETAILED DESCRIPTION OF THE EMBODIMENTS

In order to make the present application clearer and better understood, the present application will be described in detail below with reference to the drawings and combined with the embodiments.

Figure 1:
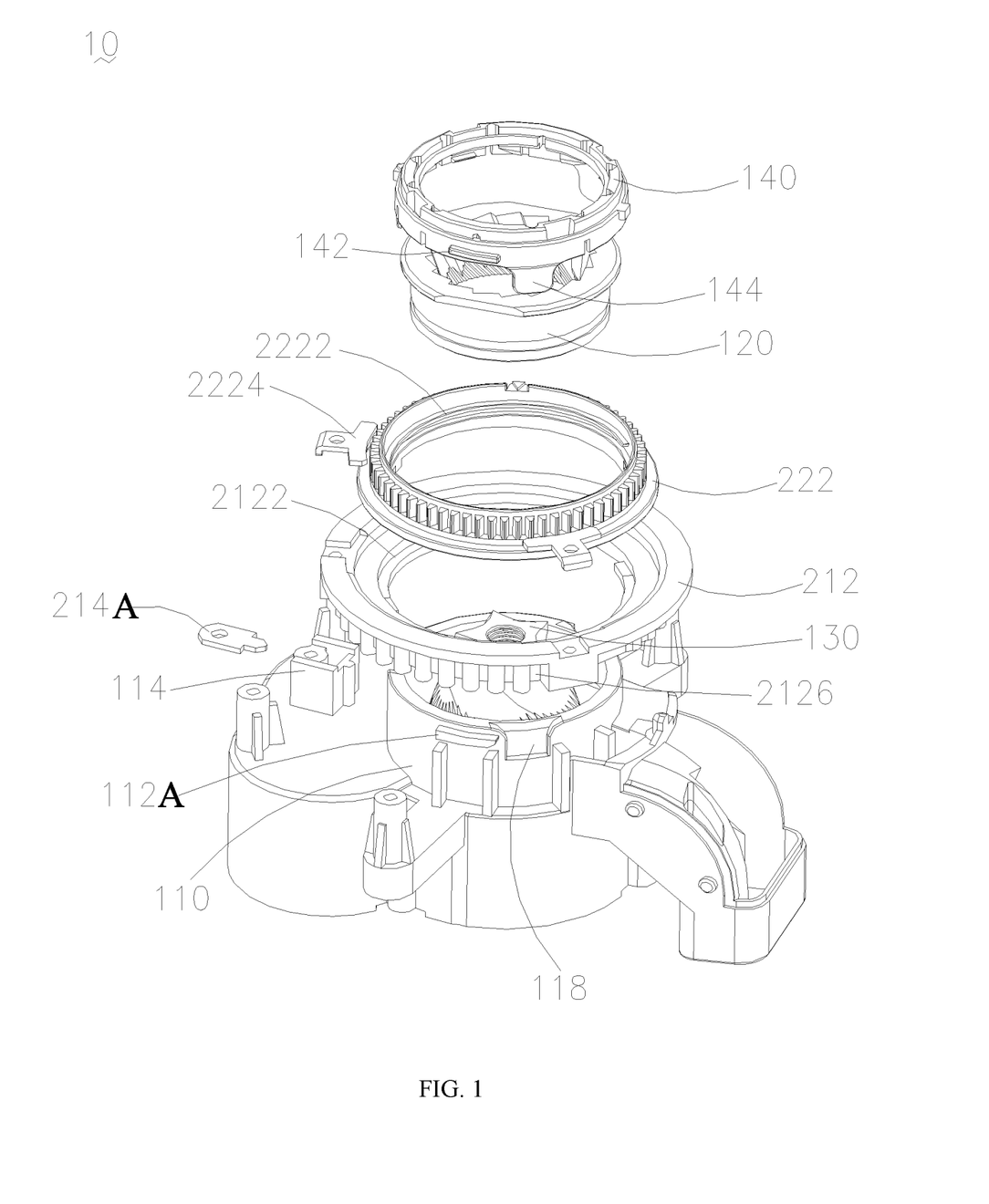
FIG. 1 is an exploded schematic diagram of a bean grinding device according to an embodiment of the present application.

Referring to FIG. 1, an embodiment of the present application provides a bean grinding device 10, including a grinding assembly and an adjusting assembly. The grinding assembly can include a bean grinding chamber 110, an outer grinding wheel 120, and an inner grinding wheel 130. The outer grinding wheel 120 and the inner grinding wheel 130 are disposed inside the bean grinding chamber 110. The adjusting assembly includes at least two stages of adjusting mechanisms. The at least two stage of adjusting mechanisms can include a first adjusting mechanism and a second adjusting mechanism; the first adjusting mechanism is connected to the bean grinding chamber 110 by means of a first track; the second adjusting mechanism is connected to the outer grinding wheel 120 by means of a second track; and positions of the first adjusting mechanism and the second adjusting mechanism are relatively fixed in an axial direction. The first adjusting mechanism and the second adjusting mechanism are configured to adjust a height of the outer grinding wheel 120, thus achieving an adjustment of the distance between the outer grinding wheel 120 and the inner grinding wheel 130.

As for the bean grinding device 10 provided in the embodiment of the present application, the distance between the inner grinding wheel 130 and the outer grinding wheel 120 is adjusted by the at least two stages of adjusting mechanisms provided in the grinding device 10, with no need to improve the manufacturing and assembly accuracy of parts. Adjusting either the first adjusting mechanism or the second adjusting mechanism can achieve a movement of the outer grinding wheel 120 in the axial direction, thus achieving a precise adjustment of the distance between the outer grinding wheel 120 and the inner grinding wheel 130. The distance between the inner grinding wheel 130 and the outer grinding wheel 120 is adjusted by the first adjusting mechanism, thereby solving a problem of different amount and different sizes of output powder of the bean grinding device 10 due to assembly errors and manufacturing errors of parts. Then, in accordance with a requirement, a selection of a shift position of different sizes of coffee powder is adjusted by the second adjusting mechanism, thereby determining the sizes of the coffee powder to be ground. Certainly, the number of the adjusting mechanisms can be further increased, so as to make the adjustment of the distance between the inner grinding wheel 130 and the outer grinding wheel 120 more precise. The arrangement of multi-staged adjustment enables multiple bean grinding devices 10 of the same batch or different batches, under a case of the same configuration, to grind coffee beans into uniform and steady powder with good uniformity in the amount and in the sizes, thereby ensuring the taste of coffee.

Figure 2:
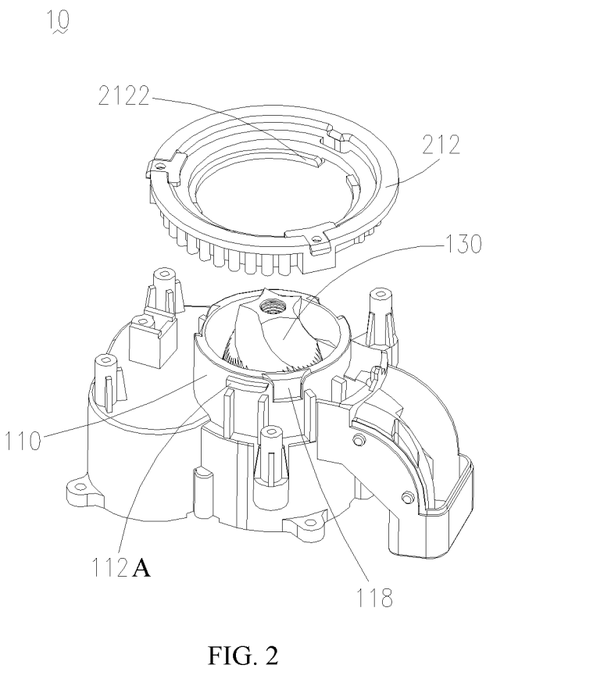
FIG. 2 is a first schematic diagram illustrating adjustment of a first adjusting mechanism according to an embodiment of the present application.
Figure 3:
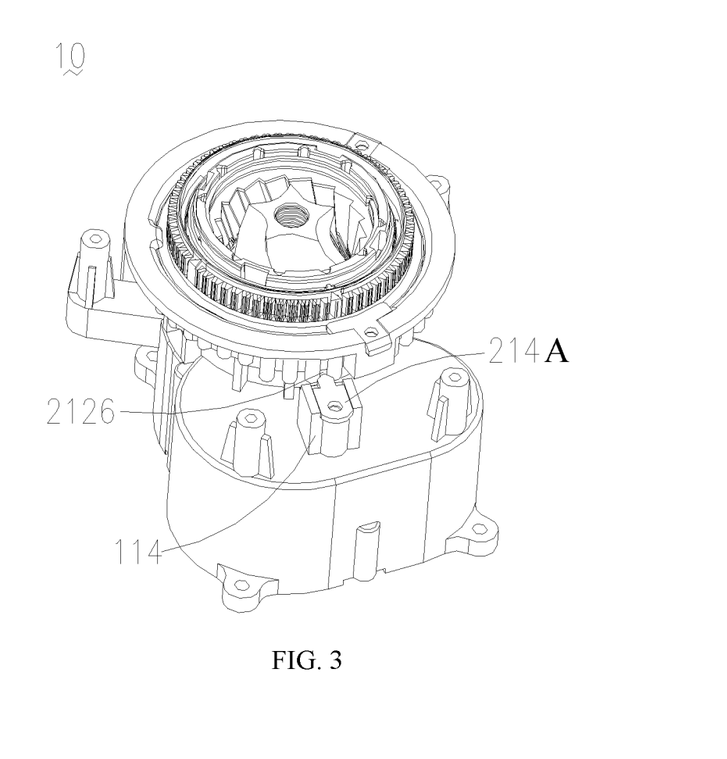
FIG. 3 is a second schematic diagram illustrating adjustment of the first adjusting mechanism in FIG. 2.

Referring to FIG. 2 and FIG. 3, the first adjusting mechanism includes a first adjusting ring 212 and a fixing member 214A. The fixing member 214A is configured to fix the first adjusting ring 212 in a circumferential direction. The first adjusting ring 212 has a first track structure extending from a first position to a second position in the axial direction. In this embodiment, the first track structure is a threaded structure 2122 disposed on an inner surface of the first adjusting ring 212. The bean grinding chamber 110 includes a snap-fit member 112A. The snap-fit member 112A can be a convex structure disposed on an outer side wall of the bean grinding chamber 110 and can slide along the threaded structure 2122, thus adjusting a relative position between the first adjusting mechanism and the bean grinding chamber 110 in the axial direction, and further adjusting the distance between the outer grinding wheel 120 and the inner grinding wheel 130. Specifically, the snap-fit member 112A is placed in a threaded track of the threaded structure 2122; when the first adjusting ring 212 rotates, the snap-fit member 112A can rotate along the threaded track of the threaded structure 2122, and the first adjusting ring 212 moves up and down relative to the snap-fit member 112A, thus achieving a change in the relative position between the first adjusting mechanism and the bean grinding chamber 110. An outer side wall of the first adjusting ring 212 has a clamping groove 2126. The bean grinding chamber 110 is provided with a clamping member 114. When the first adjusting ring 212 is adjusted to a desired position, the fixing member 214A can be mounted to the clamping member 114 and inserted into the clamping groove 2126, fixing the first adjusting ring 212 in a circumferential position. In this embodiment, the fixing member 214A is a fixing piece. The fixing piece has a plug-in end and a mounting end. Optionally, the clamping member 114 is provided with a groove structure, in which the mounting end of the fixing piece can be fixedly installed. When the mounting end is fixedly mounted into the groove structure of the clamping member 114, the plug-in end can be inserted into the clamping groove 2126 in the outer side wall of the first adjusting ring 212, thus fixing the first adjusting ring 212 in the circumferential direction. The mounting end can be fixed in the groove structure of the clamping member 114 with a screw. Fixed by the fixing member 214A, the first adjusting ring 212 can be protected from sliding after a gear position is adjusted, thereby avoiding a change in the distance between the outer grinding wheel 120 and the inner grinding wheel 130, and avoiding influences on quality of ground coffee powder.

Figure 4:
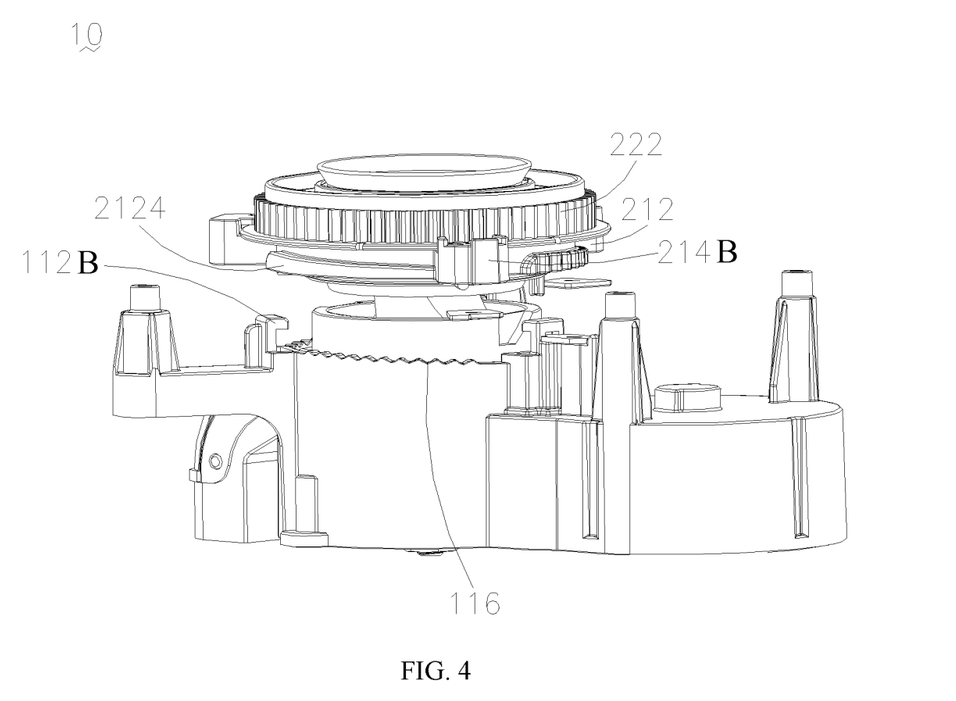
FIG. 4 is a first schematic diagram illustrating adjustment of the first adjusting mechanism according to another embodiment of the present application.
Figure 5:
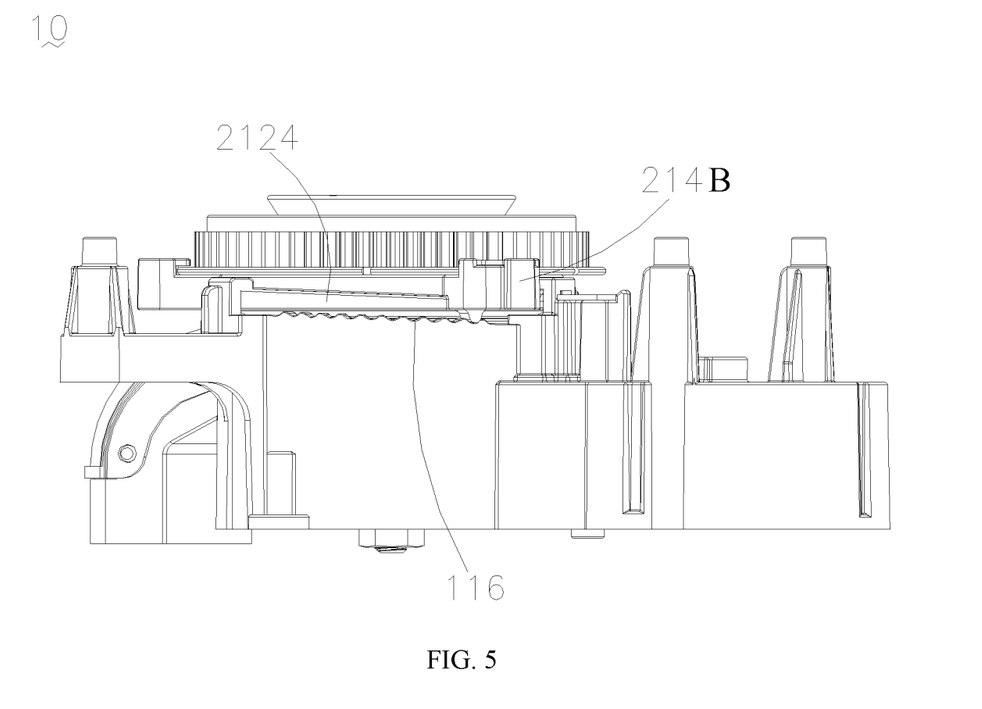
FIG. 5 is a second schematic diagram illustrating adjustment of the first adjusting mechanism in FIG. 4.

Referring to FIG. 4 and FIG. 5, in another embodiment, the first adjusting mechanism includes a first adjusting ring 212 and a fixing member 214B. The fixing member 214B is configured to fix the first adjusting ring 212 in the circumferential direction. The first adjusting ring 212 has a first track structure extending from the first position to the second position in the axial direction. In this embodiment, the first track structure is a bevel structure 2124 disposed on an outer surface of the first adjusting ring 212. The bean grinding chamber 110 includes a snap-fit member 112B. The snap-fit member 112B can be a hook-shaped structure disposed on the outer side wall of the bean grinding chamber 110 and can slide along a bevel of the bevel structure 2124, thereby adjusting the relative position between the first adjusting mechanism and the bean grinding chamber 110 in the axial direction. Specifically, an end of the snap-fit member 112B can be lapped on an upper surface of the bevel structure 2124. When the first adjusting ring 212 rotates, the snap-fit member 112B slides along the upper surface of the bevel structure 2124, and the first adjusting ring 212 moves up and down relative to the bean grinding chamber 110. In this embodiment, the fixing member 214B can be fixedly connected to the first adjusting ring 212. In an embodiment, the fixing member 214B is arranged at an end of the bevel structure 2124. When the first adjusting ring 212 rotates, the fixing member 214B is driven to rotate. The bean grinding chamber 110 can have a positioning member 116, and when the snap-fit member 112B slides along the bevel structure 2124, the fixing member 214B can slide along the positioning member 116 and fix the first adjusting ring 212 in the circumferential direction.

In an embodiment, the positioning member 116 has a wavy track structure, and the wavy track structure is arranged to be parallel to the bevel structure 2124. The wavy track structure extends from the first position to the second position in the axial direction. In a process of sliding along the wavy track structure, and when the fixing member 214B slides to a concave position of the wavy track structure, the fixing member 214B is fixed, thereby finally fixing the first adjusting ring 212 in the circumferential direction.

Figure 6:
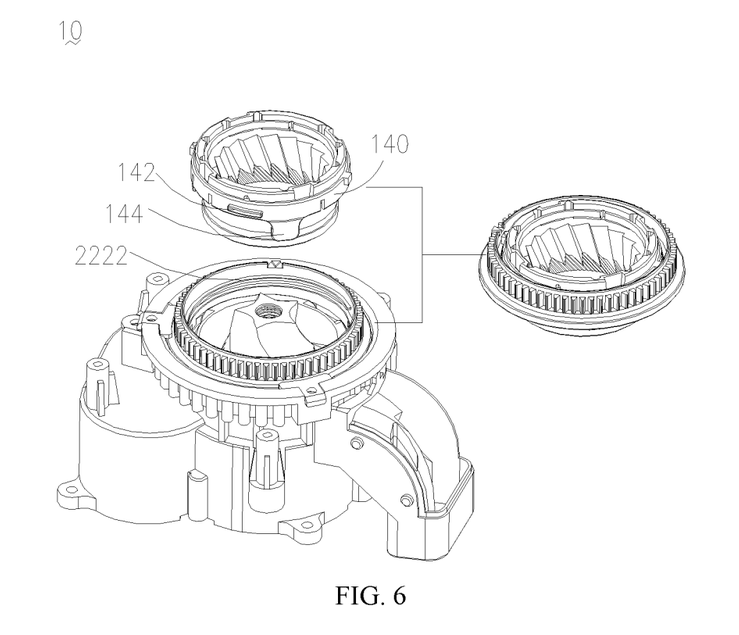
FIG. 6 is a schematic assembly diagram of an outer grinding wheel and an outer grinding wheel sleeve according to an implementation of the present application.

Referring to FIG. 1 and FIG. 6 together, the grinding assembly can further include an outer grinding wheel sleeve 140. The outer grinding wheel 120 is fixedly installed in the outer grinding wheel sleeve 140. The outer grinding wheel sleeve 140 includes a protruding member 142 and a position locking member 144. The protruding member 142 is configured to be connected to a second track of the second adjusting mechanism. The bean grinding chamber 110 has a position locking groove 118, and the position locking member 144 is configured to be locked in the position locking groove 118, thus restricting the movement of the outer grinding wheel 120 in the circumferential direction.

Figure 7:
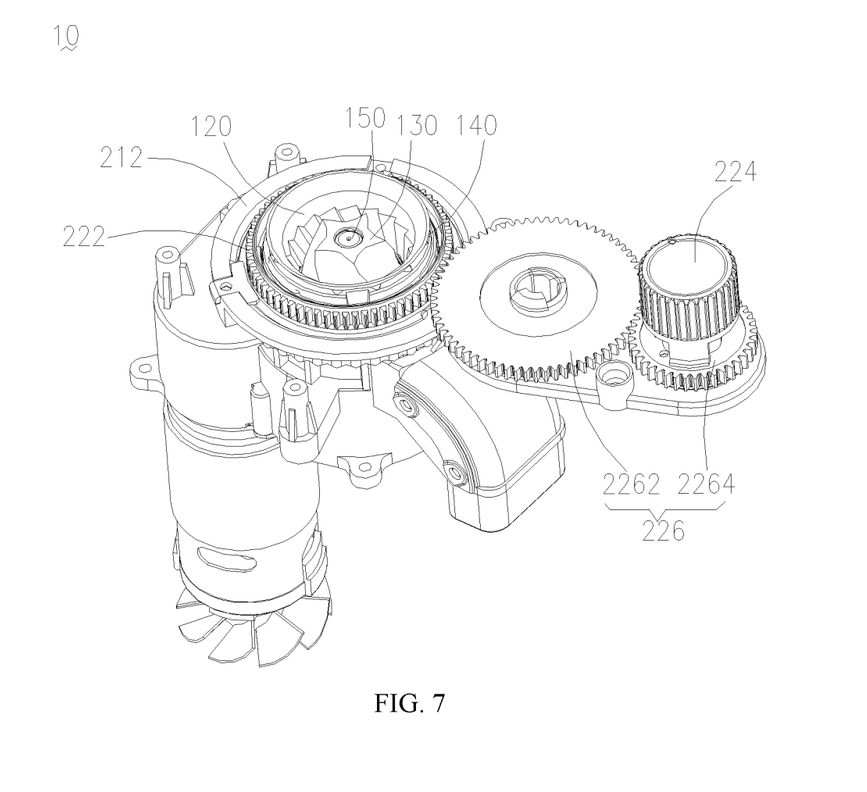
FIG. 7 is a schematic three-dimensional diagram of the bean grinding device according to an embodiment of the present application.

Referring to FIG. 7, in an embodiment, the second adjusting mechanism can include a second adjusting ring 222. A threaded track 2222 is disposed on an inner surface of the second adjusting ring 222 The protruding member 142 can move along the threaded track 2222 to adjust the distance between the outer grinding wheel 120 and the inner grinding wheel 130. When the second adjusting ring 222 rotates, since the position locking member 144 is locked and fixed in the position locking groove 118, the outer grinding wheel 120 and the outer grinding wheel sleeve 140 is prevented from moving in the circumferential direction; and the protruding member 142 of the outer grinding wheel sleeve 140 slides along the threaded track 2222, realizing an up-and-down movement of the outer grinding wheel 120 in the axial direction. Optionally, the second adjusting mechanism further includes a pressing sheet 2224. The second adjusting ring 222 includes a rotatable gear and an edge member supporting the rotatable gear, and the pressing sheet 2224 is disposed at the edge member. The pressing sheet 2224 can be configured to be fixedly connected to the first adjusting mechanism. Specifically, a notch can be provided at a corresponding position on an outer edge of the first adjusting ring 212, and the notch and the pressing sheet each have a through hole or a threaded hole at corresponding positions. The second adjusting ring 222 and the first adjusting ring 212 are fixedly connected together by a fastening nail or a screw disposed through two through holes or threaded holes at the corresponding positions, but the rotatable gear of the second adjusting ring 222 can independently rotate, that is, rotation of the rotatable gear of the second adjusting ring 222 does not necessarily drive the first adjusting ring 212 to rotate.

The inner grinding wheel 130 can be fixed to a bottom of the bean grinding chamber 110 by means of the bean grinding shaft 150. The outer grinding wheel 120 and the inner grinding wheel 130 are coaxially nested. The second adjustment mechanism can further include a shift knob 224 and a transmitting assembly 226. The transmitting assembly 226 meshes with the second adjusting ring 222. The transmitting assembly 226 is driven to rotate by rotating the shift knob 224, and finally the second adjusting ring 222 is driven to rotate. The transmitting assembly 226 can include a transmitting gear 2262 and a shifting gear 2264. The shifting gear 2264 is connected to the shift knob 224, and the transmitting gear 2262 meshes with the shifting gear 2264 and the second adjusting ring 222 respectively. The shift knob 224 is rotated to adjust a desired shift position, and at the same time, the shift knob 224 will sequentially drive the shifting gear 2264, the transmitting gear 2262 and the second adjusting ring 222 to rotate, thereby achieving the adjustment of the shift position.

The bean grinding device 10 can further include a bean box assembly provided with a raw material outlet open to the grinding assembly.

The present application also provides a bean grinding coffee machine, which includes a machine body, a control device, and any foregoing bean grinding device 10. The control device and the bean grinding device 10 are installed on the machine body.

Each of the technical features of the above embodiments can be combined arbitrarily. To simplify the description, not all possible combinations of each of the technical features in the above embodiments are described. However, all of the combinations of these technical features should be considered as within the scope of this application, as long as such combinations do not contradict with each other.

The above embodiments merely illustrate several embodiments of the present application, and the description thereof is specific and detailed, but it shall not be constructed as limiting the scope of this application. It should be noted that, for those of ordinary skill in the art, various modifications and improvements can also be made without departing from the concept of the present application and all fall within the protection scope of the present application. Therefore, the protection scope of the present application shall be subject to the appended claims.

What is claimed is:

1. A bean grinding device, comprising a grinding assembly and an adjusting assembly, wherein the grinding assembly comprises a bean grinding chamber, an outer grinding wheel, and an inner grinding wheel; the outer grinding wheel and the inner grinding wheel are disposed inside the bean grinding chamber; the adjusting assembly comprises at least two stages of adjusting mechanisms; the at least two stages of adjusting mechanisms comprise a first adjusting mechanism and a second adjusting mehanism; the first adjusting mechanism and the bean grinding chamber are connected by means of a first track; the second adjusting mechanism and the outer grinding wheel are connected by means of a second track; positions of the first adjusting mechanism and the second adjusting mecanism are relatively fixed in an axial direction; the first adjusting mechanism and the second adjusting mechanism are configured to adjust a height of the outer grinding wheel and adjust a distance between the outer grinding wheel and the inner grinding wheel, the first adjusting mechanism comprises a first adjusting ring and a fixing member; the first adjusting ring has a first track structure extending from a first position to a second position in the axial direction, the bean grinding chamber comprises a snap-fit member, the snap-fit member is disposed on an outer side wall of the bean grinding chamber, and configured to slide along the first track structure and adjust a relative position between the first adjusting mechanism and the bean grinding chamber in the axial direction; and the fixing member is configured to fix the first adjusting ring in a circumferential direction; and the first track structure is a bevel structure disposed on an outer surface of the first adjusting ring; the fixing member is fixedly connected to the first adjusting ring; the bean grinding chamber has a positioning member, and the bean grinding device is configured so that when the snap-fit member slides along the bevel structure, the fixing member slides along the positioning member and fixes the first adjusting ring.

2. The bean grinding device of claim 1, wherein the positioning member is a wavy track structure, and the wavy track structure is arranged parallel to the bevel structure.

3. The bean grinding device of claim 1, wherein the grinding assembly further comprises an outer grinding wheel sleeve; the outer grinding wheel is fixedly installed in the outer grinding wheel sleeve; the outer grinding wheel sleeve comprises a protruding member and a position locking member; the protruding member is configured to be connected to the second track of the second adjusting mechanism; the bean grinding chamber has a position locking groove; and the position locking member is configured to be locked in the position locking groove and restrict a movement of the outer grinding wheel in a circumferential direction.

4. The bean grinding device of claim 3, wherein the second adjusting mechanism comprises a second adjusting ring; a threaded track is disposed on an inner surface of the second adjusting ring; and the protruding member is configured to move along the threaded track and adjust the distance between the outer grinding wheel and the inner grinding wheel.

5. The bean grinding device of claim 4, wherein the second adjusting mechanism further comprises a pressing sheet; the second adjusting ring comprises a rotatable gear and an edge member supporting the rotatable gear; and the pressing sheet is disposed at the edge member and configured to be fixedly connected to the first adjusting mechanism.

6. The bean grinding device of claim 5, wherein a notch is provided on an outer edge of the first adjusting ring; the notch and the pressing sheet each have a through hole or a threaded hole at corresponding positions; and the second adjusting ring and the first adjusting ring are fixedly connected together by a fastening nail or a screw disposed through two through holes or threaded holes at the corresponding positions.

7. The bean grinding device of claim 4, wherein the second adjusting mechanism further comprises a shift knob and a transmitting assembly; the transmitting assembly meshes with the second adjusting ring; and the transmitting assembly is driven to rotate by rotating the shift knob, and the second adjusting ring is driven to rotate.

8. The bean grinding device of claim 7, wherein the transmitting assembly comprises a transmitting gear and a shifting gear; the shifting gear is connected to the shift knob; and the transmitting gear meshes with the shifting gear and the second adjusting ring respectively.

9. A bean grinding coffee machine, comprising the bean grinding device of claim 1.

10. The bean grinding device of claim 1, wherein the snap-fit member is a hook-shaped structure disposed on the outer side wall of the bean grinding chamber; an end of the snap-fit member is lapped on an upper surface of the bevel structure, and configured to slide along a bevel of the bevel structure.

11. The bean grinding device of claim 1, wherein the fixing member is arranged at an end of the bevel structure.

12. The bean grinding device of claim 1, wherein the inner grinding wheel is fixed to a bottom of the bean grinding chamber by means of a bean grinding shaft.

13. The bean grinding device of claim 1, wherein the outer grinding wheel and the inner grinding wheel are coaxially nested.

14. The bean grinding device of claim 1, further comprising a bean box assembly provided with a raw material outlet open to the grinding assembly.

15. A bean grinding device, comprising a grinding assembly and an adjusting assembly, wherein the grinding assembly comprises a bean grinding chamber, an outer grinding wheel, and an inner grinding wheel; the outer grinding wheel and the inner grinding wheel are disposed inside the bean grinding chamber; the adjusting assembly comprises at least two stages of adjusting mechanisms; the at least two stages of adjusting mechanisms comprise a first adjusting mechanism and a second adjusting mechanism; the first adjusting mechanism and the bean grinding chamber are connected by means of a first track; the second adjusting mechanism and the outer grinding wheel are connected by means of a second track; positions of the first adjusting mechanism and the second adjusting mechanism are relatively fixed in an axial direction; the first adjusting mechanism and the second adjusting mechanism are configured to adjust a height of the outer grinding wheel and adjust a distance between the outer grinding wheel and the inner grinding wheel;

the grinding assembly further comprises an outer grinding wheel sleeve; the outer grinding wheel is fixedly installed in the outer grinding wheel sleeve; the outer grinding wheel sleeve comprises a protruding member and a position locking member; the protruding member is configured to be connected to the second track of the second adjusting mechanism; the bean grinding chamber has a position locking groove; and the position locking member is configured to be locked in the position locking groove and restrict a movement of the outer grinding wheel in a circumferential direction;

the second adjusting mechanism comprises a second adjusting ring; a threaded track is disposed on an inner surface of the second adjusting ring; and the protruding member is configured to move along the threaded track and adjust the distance between the outer grinding wheel and the inner grinding wheel; and the second adjusting mechanism further comprises a pressing sheet; the second adjusting ring comprises a rotatable gear and an edge member supporting the rotatable gear; and the pressing sheet is disposed at the edge member and configured to be fixedly connected to the first adjusting mechanism.

\* \* \* \* \*

UNITED STATES PATENT AND TRADEMARK OFFICE
CERTIFICATE OF CORRECTION

PATENT NO. : 11,382,461 B2  
APPLICATION NO. : 16/957656  
DATED : July 12, 2022  
INVENTOR(S) : Xiaolin Chen and Guozhi Zhao Page 1 of 1

It is certified that error appears in the above-identified patent and that said Letters Patent is hereby corrected as shown below:

In the Specification

In Column 7, Line 4, replace "mehanism;" with --mechanism;--

In Column 7, Line 9, replace "mecanism" with --mechanism--

Signed and Sealed this  
Sixth Day of August, 2024

Katherine Kelly Vidal  
*Director of the United States Patent and Trademark Office*